United States Patent [19]
Wilhelmstätter et al.

[11] Patent Number: 5,988,933
[45] Date of Patent: Nov. 23, 1999

[54] DEVICE FOR CONNECTING A SPRING WITH A BELT-SHAPED OR ROPE-SHAPED TRANSMISSION ELEMENT

[75] Inventors: Johann Wilhelmstätter, Giengen/Hürben; Helmut Jerg, Giengen; Bernd Schessl, Dillingen; Gerhard Fetzer, Gundelfingen; Michael Hartmann, Höchstädt; Markus Höpfl, Lauingen/Donau; Karl-Heinz Rehm, Dischingen; Rudolf Schmidt, Giengen, all of Germany

[73] Assignee: BSH Bosch und Siemens Hausgeraete GmbH, Munich, Germany

[21] Appl. No.: 08/821,079

[22] Filed: Mar. 20, 1997

[30] Foreign Application Priority Data

Mar. 20, 1996 [DE] Germany ............ 196 11 051

[51] Int. Cl.⁶ .................................................. B25G 3/08
[52] U.S. Cl. ........................... 403/381; 126/191; 49/386; 312/319.2
[58] Field of Search .................... 312/327, 328, 312/319.1, 319.2, 319.4; 126/191, 194; 160/191, 192; 403/381; 49/386

[56] References Cited

U.S. PATENT DOCUMENTS

| | | | |
|---|---|---|---|
| 3,704,550 | 12/1972 | Hancock | 49/386 |
| 3,955,865 | 5/1976 | Wilson | 312/319 |
| 4,601,446 | 7/1986 | Opsahl | 49/386 X |
| 4,775,258 | 10/1988 | Lange | 403/381 X |
| 4,919,558 | 4/1990 | Mascitelli et al. | 403/381 X |
| 5,134,805 | 8/1992 | Frantzen et al. | 49/386 |

*Primary Examiner*—Brian K. Green
*Assistant Examiner*—William L. Miller
*Attorney, Agent, or Firm*—Herbert L. Lerner; Laurence A. Greenberg

[57] ABSTRACT

A device for connecting a spring to a band-like or cable-like transmission apparatus. The device being easy to assemble and in which the risk of fracture of the device is greatly reduced. The device provides a connecting part to be fitted on the transmission apparatus and a hook-in part to be connected onto the spring. The connecting part then being connected to the hook-in part to connect the transmission apparatus to the spring.

9 Claims, 2 Drawing Sheets

DEVICE FOR CONNECTING A SPRING WITH A BELT-SHAPED OR ROPE-SHAPED TRANSMISSION ELEMENT

BACKGROUND OF THE INVENTION

FIELD OF THE INVENTION

The invention relates to a device for connecting a spring to a band-like or cable-like transmission means.

Such connections are required, e.g. in domestic appliances with a door which can be pivoted around a horizontal spindle and is mounted on a housing, for the purpose of compensating the weight of the door in order to facilitate the handling, in particular the closure, of the door for the user. In this case, the weight is compensated by a spring, usually a tension spring, which is fastened on a housing and is connected to the door directly or by transmission means.

German Utility Model 74 32 124 discloses such a device for compensating the weight of a domestic-dishwasher door which is located at the front of the dishwasher, can be pivoted around a horizontal spindle, is mounted on a housing and is connected, by means of a band-like or cable-like transmission means, to a tension spring fastened on the housing, in the case of which device the transmission means is fitted, in a manner which is not described, in an eyelet of the spring which has been produced by bending up the last winding of said spring.

It has been shown, in practice, that the springs, which are subjected to very high stressing for the purpose of weight compensation in such a device, break, particularly at the eyelets produced by bending up the last winding of the spring, after a comparatively small number of load changes, that is to say door-opening movements. Furthermore, the insertion of the ends of the transmission means is time-consuming and thus expensive, and it is necessary to provide a fastening device on the transmission means, usually an eyelet, which constitutes a further operation and produces a further location which is at risk of fracture in a spring/transmission means connection.

SUMMARY OF THE INVENTION

The object of the invention is thus to provide, in a simple manner, a device for connecting a spring to a band-like or cable-like transmission means, which device is easy to assemble and in which the risk of fracture is avoided as far as possible.

This object is achieved according to the invention in that the transmission means is fitted, by means of a connecting part connected fixedly to it, on a hook-in part connected to the spring.

One of the abovedescribed locations which is at risk of fracture is effectively replaced by the fixed connection between the band-like or cable-like transmission means and the connecting part. Fastening the hook-in part on the spring effectively avoids the location which is most at risk of fracture, namely, as in the prior art, the last, bent-up winding of the spring, and thus effectively avoids the risk of fracture. Fitting the connecting part into the hook-in part renders assembly considerably easier than the insertion operation in the prior art. The inventive device for connecting a spring to a band-like or cable-like transmission means provides, in a simple manner, a device which is easy to assemble and in which the risk of fracture is avoided as far as possible.

According to a preferred embodiment of the invention, in the receiving region for the connecting part, the hook-in part is in the form of a centrally slotted eyelet, of which the front and lateral delimitations are formed by two hooks whose ends project towards one another at a spacing apart, this further facilitating assembly.

In a particularly advantageous manner, the connecting part is in the form of a flat plate which, in two regions arranged one beside the other at a spacing apart, is offset at least by the thickness of the hook-in part, this resulting in further-simplified positioning of the connecting part according to the invention in the hook-in part according to the invention being possible without the reliability of the connection being reduced. The connecting part is placed on the hook-in part, for example, from above, the front ends of the offset regions coming to butt against the inner edges of the hooks of the hook-in part as a result of the stressing of the spring in the use state.

Expediently, the spacing between the offset regions at most corresponds to the spacing between the ends of the hooks of the hook-in part, thus achieving additional guidance of the inserted connecting part.

Assembly is facilitated further in that, at the ends of the offset regions, said ends being situated opposite the transmission element, the connecting part has a region which is overlapped by a plate, at least a spacing corresponding to the thickness of the hook-in part remaining between the underside of the plate and the surface of the offset regions since the overlap makes it possible for the loose connecting part to be secured on the hook-in part even before stressing of the spring commences.

Advantageously, the slotted eyelet is of an essentially rectangular shape with essentially rectangular hooks, and the connecting element is of an essentially cuboidal shape, as a result of which it is easy to produce the parts of the device according to the invention.

In a particularly advantageous manner, the inner edges of the hooks, which form a delimitation of the eyelet opening, and the end surfaces of the offset regions are arranged so as to be inclined, in the direction of the spacing, towards the eyelet opening, which, as a result of the hooking-behind action and of consequently improved securing, means that assembly is facilitated further.

The transmission means is preferably a cable produced from a thermoplastic synthetic material. It has been shown, in practice, that, for example, steel cables wear more quickly than synthetic material cables.

One transmission means which has been shown to be particularly durable in practice is a braided cable made of polyester.

Particularly simple production and a particularly fracture-resistant connection between the connecting part and the transmission element is provided by the connecting part being produced so as to encapsulate the transmission element.

The connecting part is preferably produced from polyoxymethylene (POM) this having proven to be particularly fracture-resistant in practice.

DESCRIPTION OF THE PREFERRED EMBODIMENT

Figure 1:
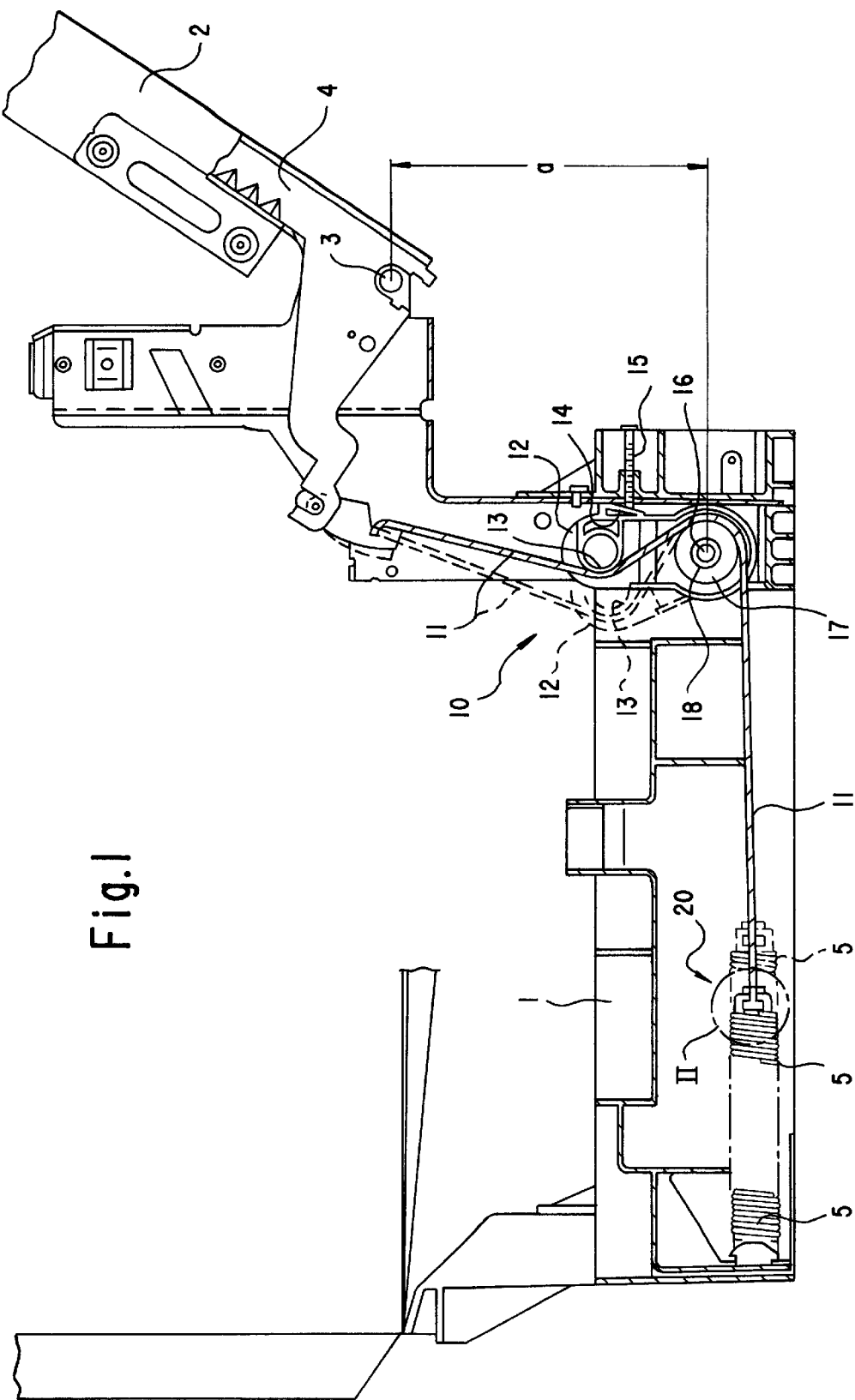
FIG. 1 shows a section through a base of a domestic dishwasher.

A domestic dishwasher (not explained in any more detail) has a door 2 which is located at the front, can be pivoted around a horizontal spindle 3 and is mounted in a machine base 1, which is part of a housing. This door 2 is connected, in a manner which is not described in any more detail, on both sides of the front of the machine base 1 by means of in each case one hinge 4 connected to the door 2. A device 10 for weight compensation comprises a tension spring 5 which is fastened in the machine base 1 and is connected to the door 2, or, in the exemplary embodiment, to the hinge 4, by means of a band-like or cable-like transmission means 11, in the depicted exemplary embodiment by means of a cable 11 made of a thermoplastic synthetic material, preferably a braided cable 11 made of polyester. This cable 11 butts, with stressing, against a deflection roller 17, arranged in a carrier 12 fastened in the machine base 1, and partially encloses said deflection roller.

Figure 2:
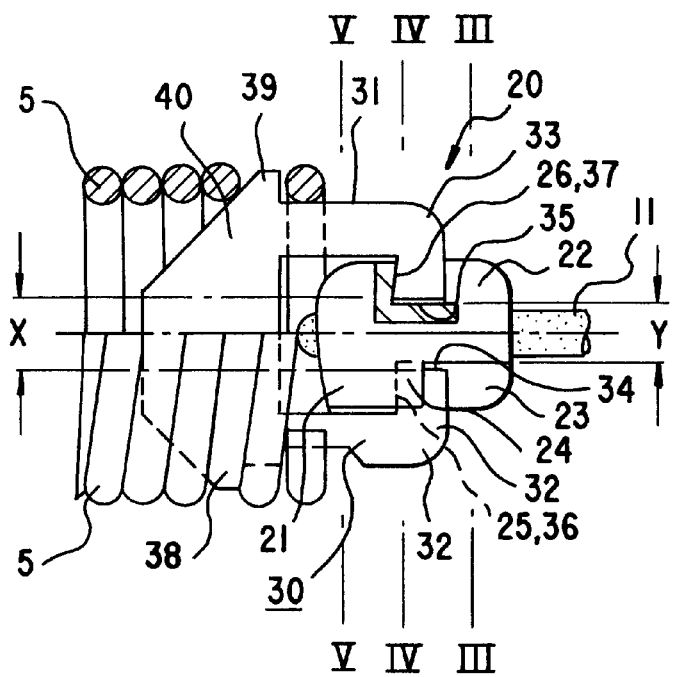
FIG. 2 shows an enlarged illustration of the device according to the invention, the illustration corresponding to the detail II in FIG. 1.

According to the invention, the transmission means, in the exemplary embodiment the cable 11, is fitted, by means of a connecting part 21 connected fixedly to it, on a hook-in part 30 connected fixedly to the spring 5, as can best be seen in FIG. 2.

In the receiving region for the connecting part 21, the hook-in part 30 is in the form of a centrally slotted eyelet 31, of which the front and lateral delimitations are formed by two hooks 32, 33 whose ends 34, 35 project towards one another at a spacing x apart.

Figure 3:
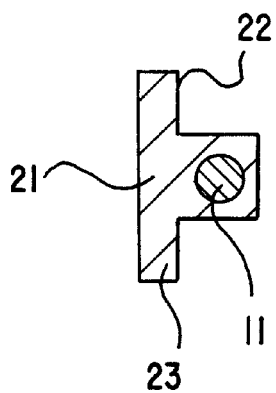
FIG. 3 is a cross-sectional view of a connecting part taken along the line III—III shown in FIG. 2.

The connecting part 21 is in the form of a flat plate which, in two regions 22, 23 arranged one beside the other at a spacing y apart, as shown in FIG. 3 is offset at least by the thickness of the hook-in part 30. According to the invention, this distance y between the offset regions 22, 23 at most corresponds to the distance x between the ends 34, 35 of the hooks 32, 33 of the hook-in part 30. In the depicted exemplary embodiment, the distance y between the two offset regions 22, 23 is selected to be somewhat smaller than the distance x between the ends 34, 35 of the hooks 32, 33, in order to facilitate the operation of fitting the connecting part 21 in the hook-in part 30.

Figure 4:
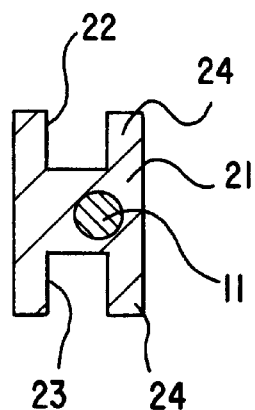
FIG. 4 is a cross-sectional view of the connecting part taken along the line IV—IV shown in FIG. 2.
Figure 5:
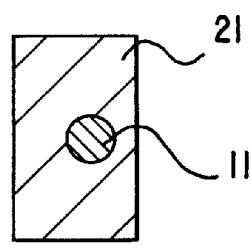
FIG. 5 is a cross-sectional view of the connecting part taken along the line V—V shown in FIG. 2.

At the end of the offset regions 22, 23, said end being situated opposite the transmission element, the connecting part 21 has a region which is overlapped by a plate 24, at least a spacing corresponding to the thickness of the hook-in part 30 remaining between the underside of the plate 24 and the surface of the offset regions 22, 23 as shown in FIG. 4. In FIG. 2, a plate above the offset region 22 is left out in order for it to be possible to illustrate the hook 33 more clearly. In FIG. 5, there is shown a cross-sectional view of the rear part of the connecting part 21.

In the exemplary embodiment, the slotted eyelet 31 is of an essentially rectangular shape with essentially rectangular hooks 32, 33, the inner edges 36, 37 of the hooks 32, 33 which form a delimitation of the eyelet opening, being arranged so as to be inclined, in the direction of the spacing x, towards the eyelet opening. The connecting part 21 is of an essentially cuboidal shape, the end surfaces 25, 26 of the offset regions 22, 23 likewise being inclined corresponding to the inner edges 36, 37 of the hooks 32, 33.

The connecting part 21, which is produced from POM, is produced so as to encapsulate the braided cable 11 made of polyester.

The hook-in part 30 is fastened on the spring 5 by means of lateral projections 38, 39, a trapezoidal insertion aid 40 which is located opposite the eyelet 31 and adjoins the lateral projections 38, 39 being pushed into the spring 5 until at least the first winding springs over the outer edges of the lateral projections 38, 39 and encloses the hook-in part 30 in the vicinity of the eyelet 31.

In the exemplary embodiment described, in order to adjust the spring force, the carrier 12, which has a projecting abutment stub 13, is mounted pivotably on the machine base 1, the pivot point 16 of the carrier 12 being arranged at the greatest possible vertical spacing a from the door-bearing spindle 3. The cable 11 butts against the abutment stub 13 of the carrier 12 on a side situated opposite an adjustment screw 15. The adjustment screw 15 butts against that end of the carrier 12 which is located towards the door 2, remote from the pivot point 16 of the carrier 12, for which purpose the carrier 12 has an abutment surface 14. The deflection roller 17 is mounted rotatably at the pivot point 16 of the carrier 12. The pivot point 16 of the carrier 12 is formed by a bearing bolt 18 which is fastened on the machine base 1 and on which the deflection roller 17 is also mounted rotatably.

In order to increase the force of the tension spring 5, e.g. when a panel is fastened on the door 2 in order to match the domestic dishwasher with the front of kitchen fittings, this of course changing the weight of the door 2 which is to be compensated, the adjustment screw 15 is screwed in in the direction of the carrier 12, in which case it comes to butt against the abutment surface 14 of the carrier 12 and the latter is pivoted, around the bearing bolt 18 forming the pivot point 16 of the carrier 12, in the direction of the interior of the machine base 1, the cable 11 being carried along as a result of said cable butting against the abutment stub 13. As a result of the cable 11 being acted on in this way, it is displaced out of the position in which the adjustment screw 15 is not activated, i.e. out of the angle by which it encloses the deflection roller 17 and which is predetermined in the rest position by the selected arrangement, which displacement results in the cable 11/tension spring 5 assembly lengthening and, since the cable 11 cannot extend to any considerable extent, achieves extension of the tension spring 5 and thus an increase in the tension-spring force. In FIG. 1, the device 10 is shown with solid lines in the rest position and with chain-dotted lines in the position in which it has been pivoted to the maximum extent.

If, once an increase in spring force has already taken place, the spring force is to be reduced again, then the adjustment screw 15 is correspondingly unscrewed from the machine base 1, this resulting in a shortening of the cable 11/tension spring 5 assembly and thus in a shortening of the tension spring 5, as a result of which a reduction in the spring force is achieved.

For assembly, the connecting part 21 is positioned on the slotted eyelet 31 of the hook-in part 30 from above, the web which is formed in the spacing y between the offset regions 22, 23 dropping into the slot formed by the spacing x between the ends 34, 35 of the hooks 32, 33. Thereafter, e.g. by pulling on the cable 11, the connecting part 21, which is now located in the eyelet opening, is moved in the direction of the hook inner edges 36, 37 until the end surfaces 25, 26 of the offset regions 22, 23 butt against the hook inner edges 36, 37 and the latter are thus at least partially overlapped by the plates 24. The stressing of the spring 5 in the use state causes the front end surfaces 25, 26 of the offset regions 22, 23 to remain in abutment against the inner edges 36, 37 of the hooks 32, 33 of the hook-in part 30.

The abovedescribed, inventive device 20 for connecting a spring 5 to a band-like or cable-like transmission means 11, in the exemplary embodiment to a cable 11, provides, in a simple manner, a device 20 which is easy to assemble and in which the risk of fracture is avoided as far as possible.

We claim:

1. A device for interconnecting a spring and a belt-shaped or rope-shaped transmission element, which comprises:

a connecting part being substantially cuboid and having a longitudinal axis, a front portion, a middle portion and a rear portion;

said connecting part having two recesses formed therein resulting in a substantially T-shaped cross-section at said front portion, a substantially H-shaped cross section at said middle portion, and a substantially rectangular cross section at said rear portion, the cross sections taken perpendicular to the longitudinal axis; and a hook-in part having two substantially L-shaped hooks, said hooks having ends facing each other, and said ends of said hooks formed to be hooked in said recesses.

2. A device for interconnecting a spring and a belt-shaped or rope-shaped transmission element, which comprises:

a connecting part to be fixedly connected on the transmission element;

a hook-in part to be mounted in and held by the spring, said connecting part being hooked into said hook-in part for connecting the spring to the transmission element;

said hook-in part having a receiving region for said connecting part, said receiving region being formed with a centrally slotted eyelet and two hooks forming forward and lateral boundaries thereof, said hooks having ends projecting towards one another at a spacing;

said connecting part being a flat plate having a longitudinal axis and being formed with two laterally spaced-apart regions at a given spacing, each of said spaced-apart regions having a recessed step formed therein, such that a cross-section taken perpendicularly to the longitudinal axis of said flat plate is substantially T-shaped, said recessed step being at least as deep as a protruding length of said hook-in part, and the given spacing at most equals the spacing between said ends of said hooks of said hook-in part; and a plate having an inner side covering a region of said connecting part at ends of said recessed step and disposed opposite said recessed step, at least a spacing equal to the thickness of said hook-in part remaining between said inner side of said plate and a surface of said recessed step.

3. The device according to claim 2, wherein said slotted eyelet is substantially rectangular and said hooks are substantially rectangular, and said connecting part has a substantially cuboid shape.

4. The device according to claim 2, wherein said hooks have inner edges, and said spaced-apart regions having end surfaces inclined, in a direction of the spacing, towards said eyelet.

5. The device according to claim 2, wherein the transmission element is a cord of thermoplastic synthetic material.

6. The device according to claim 2, wherein the transmission element is a braided polyester cable.

7. The device according to claim 2, wherein said connecting part is molded to fit around and encapsulate part of the transmission element.

8. The device according to claim 2, wherein said connecting part is produced from polyoxymethylene.

9. A device for interconnecting a spring and a belt-shaped or rope-shaped transmission element, which comprises:

a connecting part to be fixedly connected on the transmission element;

a spring;

a hook-in part mounted in and held by said spring, said connecting part being hooked into said hook-in part for connecting said spring to the transmission element;

said hook-in part having a receiving region for said connecting part, said receiving region being formed with a centrally slotted eyelet and two hooks forming forward and lateral boundaries thereof, said hooks having ends projecting towards one another at a spacing;

said connecting part being a flat plate having a longitudinal axis and being formed with two laterally spaced-apart regions at a given spacing, each of said spaced-apart regions having a recessed step formed therein, such that a cross-section taken perpendicular the longitudinal axis of said flat plate is substantially T-shaped, said recessed step being at least as deep as a protruding length of said hook-in part, and the given spacing at most equals the spacing between said ends of said hooks of said hook-in part; and a plate having an inner side covering a region of said connecting part at ends of said recessed step and disposed opposite said recessed step, at least a spacing equal to the thickness of said hook-in part remaining between said inner side of said plate and a surface of said recessed step.

* * * * *